(12) United States Patent
Archer et al.

(10) Patent No.: US 9,877,214 B1
(45) Date of Patent: Jan. 23, 2018

(54) PASSIVE QUALITY OF EXPERIENCE MEASUREMENTS

(71) Applicant: Sprint Spectrum LP, Overland Park, KS (US)

(72) Inventors: Michael Archer, Olathe, KS (US); Bret Hitchcock, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 49 days.

(21) Appl. No.: 14/559,094

(22) Filed: Dec. 3, 2014

(51) Int. Cl.
*H04W 24/08* (2009.01)
*H04W 24/10* (2009.01)

(52) U.S. Cl.
CPC ........... *H04W 24/08* (2013.01); *H04W 24/10* (2013.01)

(58) Field of Classification Search
CPC ...... H04W 24/00; H04W 24/08; H04W 24/10
USPC ............................................ 455/67.11, 456.6
See application file for complete search history.

(56) References Cited

U.S. PATENT DOCUMENTS

| | | | |
|---|---|---|---|
| 2002/0120727 A1* | 8/2002 | Curley | H04L 41/12 709/223 |
| 2005/0163047 A1* | 7/2005 | McGregor | H04W 24/00 370/229 |
| 2008/0026768 A1* | 1/2008 | Fok | H04N 21/4126 455/452.2 |
| 2014/0228017 A1* | 8/2014 | Chang | H04W 24/10 455/422.1 |

* cited by examiner

*Primary Examiner* — Vladimir Magloire
*Assistant Examiner* — Donald H. B. Braswell

(57) ABSTRACT

To determine a cause of a customer experience event (e.g., dropped call or choppy video) passively collected measures from various network layers (e.g., internet, transport, application, etc.) are used to establish user activity across multiple service types (a.k.a., contexts). These contexts are monitored across parallel contexts, services, and/or sockets. The multiple contexts are aggregated for analysis. The multiple contexts can be analyzed to determine a cause of the customer experience event.

7 Claims, 5 Drawing Sheets

US 9,877,214 B1

PASSIVE QUALITY OF EXPERIENCE MEASUREMENTS

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

An important component of providing wireless service is to ensure the satisfaction of the customer using a wireless device. For example, many customers expect calls will not be dropped, web surfing will be responsive, and videos will play smoothly without interruption. Failing to meet these expectations can lead to the loss of wireless customers.

Overview

In an embodiment, a method of operating a communication system, includes receiving an indicator of a customer experience event that is associated with a wireless device. A plurality of indicators associated with the customer experience event are also received. These indicators are associated with a respective plurality of network layers. Based on these indicators, a cause of the customer experience event is determined.

In an embodiment, a communication system comprises a plurality of network layers that are associated with communicating with a wireless device. The pluralities of network layers are configured to measure a plurality of throughput indicators. The communication system also includes an event analyzer configured to, based on the plurality of throughput indicators, determine a cause of a customer experience event.

In an embodiment, a processing node is configured to receive an indicator of a customer experience event that is associated with a wireless device and plurality of indicators associated with the customer experience event. These plurality of indicators are associated with a respective plurality of network layers. The processing node is also configured to, based on these indicators, determine a cause of the customer experience event.

DETAILED DESCRIPTION

In an embodiment, passively collected measures from various network layers (e.g., internet, transport, application, etc.) are used to establish user activity across multiple service types (a.k.a., contexts). These contexts are monitored across parallel contexts, services, and/or sockets. The multiple contexts are aggregated for analysis.

In other words, in the event of a failure (e.g., dropped call, slow download—i.e., customer experience event), the collected measures from the various network layers are analyzed to determine, from end-to-end, all of the activities that a user was engaged in when the event occurred. Take, for example, a dropped call event. At the time of the dropped call, the collected measures are analyzed and it is determined from those measures that the user was also simultaneously watching a video and uploading a file. The measures are further analyzed. From that analysis it may be determined that the large bandwidth requirements of the video and the upload (at the application network layer) may have overwhelmed the available air-interface bandwidth (at the physical network layer) thereby causing or contributing to the failure.

Figure 1:
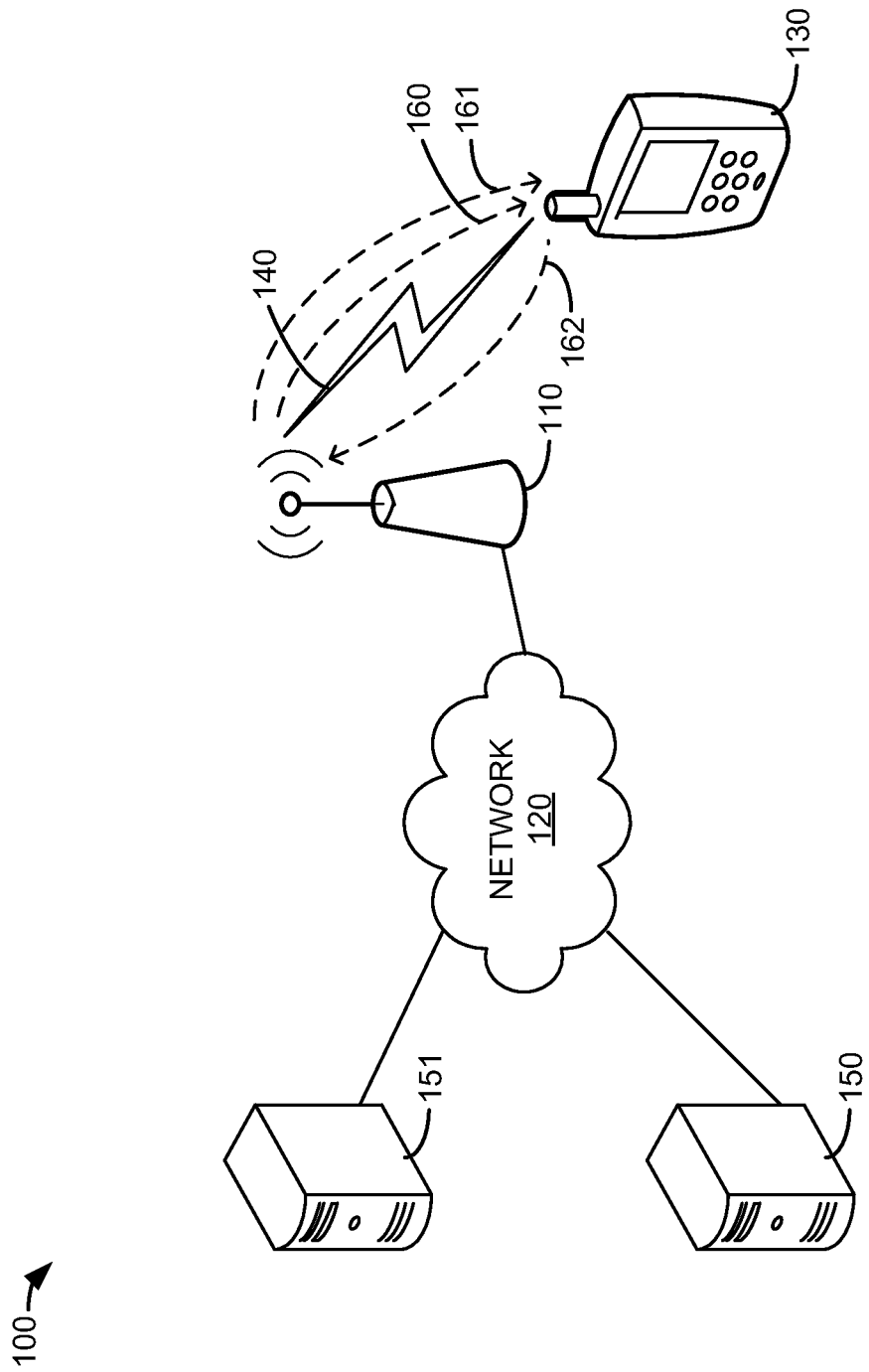
FIG. 1 is a block diagram of a communication system.

FIG. 1 is a block diagram of a communication system. In FIG. 1, communication system 100 comprises access node 110, network 120, wireless device 130, processing node 150, and content server 151. In FIG. 1, access node 110 is operatively coupled to network 120. Network 120 is operatively coupled to processing node 150 and content server 151. Wireless device 130 is operatively coupled to access node 110 via wireless link 140. Thus, wireless device 130 may communicate with processing node 150, and content server 151, via network 150 and access node 110. Content services (e.g., voice, video, download, upload, email, and/or web services) may be provided to/from wireless device 130. A content service may be provided to/from wireless device 130 using content server 151.

At any given time (and at the time of a customer experience event and/or failure, in particular) wireless device 130 may be engaged in multiple activities (e.g., a voice call, watching a video, downloading a file, uploading a picture, sending email, web browsing, etc.) These activities (contexts) may result in multiple data/traffic streams flowing between wireless device 130 and access node 110 (in both uplink and downlink directions). These multiple contexts/streams are illustrated in FIG. 1 by arrows 160-162. These multiple data/traffic streams 160-162 may be further carried by the elements of communication system 100 (and network 120, in particular) to content server 151. Information about these multiple data/traffic streams 160-162 gathered by elements of communication system 100 (e.g., gathered by wireless device 130, or access node 110) can be communicated to processing node 150 for analysis by an event analyzer.

Access node 110 is a network node capable of providing wireless communication to wireless device 130. Access node 110 can be, for example, one or more of a base transceiver station, a radio base station, an eNodeB device, or an enhanced eNodeB device.

Communication system 100 is a communication network that can provide wireless communication to wireless devices 130. Network 120 is a communication network that can provide communication between access node 110, processing node 150, content server 151 and wireless device 130. Communication system 100 and network 120 can comprise wired and/or wireless communication networks that include processing nodes, routers, gateways, physical and/or wireless data links for carrying data among various network elements, including combinations thereof, and can include a local area network, a wide area network, and an internetwork (including the Internet). Communication system 100 and network 120 can also comprise wireless networks, including base station, wireless communication nodes, telephony switches, internet routers, network gateways, computer systems, communication links, or some other type of communication equipment, and combinations thereof.

Wired network protocols that may be utilized by communication system 100 and/or network 120 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by communication system 100 and/or network 120 may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Links between elements of communication system 100, can be, for example, twisted pair cable, coaxial cable or fiber optic cable, or combinations thereof. Wireless link 140 can be a radio frequency, microwave, infrared, or other similar signal. Wireless link 140 can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 (and present in network 120, in particular) to facilitate wireless communication to/from wireless device 130 but are omitted for clarity, such as base stations, base station controllers, gateways, mobile switching centers, dispatch application processors, and location registers such as a home location register or visitor location register. Furthermore, other network elements may be present to facilitate communication between among elements of communication system 100 which are omitted for clarity, including additional processing nodes, routers, gateways, and physical and/or wireless data links for carrying data among the various network elements.

Wireless device 130 may be any device, system, combination of devices, or other such communication platform capable of communicating wirelessly with access node 110. Wireless device 130 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110. Other types of communication platforms are possible.

In an embodiment, wireless device 130 may experience a customer experience event. For example, wireless device 130 may experience a dropped call, poor call quality, choppy video, and/or slow website download. Processing node 150 may receive an indicator that this customer experience event occurred. Processing node 150 may analyze a plurality of indicators associated with this customer experience event in order to determine the cause of this customer experience event.

For example, processing node 150 may receive passively collected measured from various layers of the Internet protocol suite (e.g., the network transport application and physical layers) that can be used to analyze the cause of the customer experience event. Passively collected measures associated with the customer experience event may be used to determine service types associated with wireless device and the customer experience event when the customer experience event occurred. For example, processing node 150 may receive throughput measurements from various network layers that are used to help determine the cause of customer experience event. These various network layers may include the air-interface layer, network layer, and application layer.

Processing node 150 can execute an event analyzer to help determine the cause of a customer experience event based on the indicators received from other processing nodes, access node 110, and/or wireless device 130. In other words, the network layers running on wireless device 130, access node 110, and the elements of network 120, and/or content server 151 may be configured to passively measure indicators that can help determine the cause (or causes) of the customer experience event. For example, wireless device 130, access node 110, one or more elements of network 120, and/or content server 151, may be configured to passively measure throughput associated with wireless device 130, applications running on wireless device 130, and/or service types being provided to wireless device 130.

Based on the passively measured indicators, processing node 150 may determine a context, quality of service, and quality of experience indicators. Processing node 150 can use indicators passively measured by network layers running on wireless device 130, access node 110, and/or content server 151 to establish what activity a user of wireless device 130 was engaged in when the customer experience event occurred. Processing node 150 may use these passively measured indicators to monitor multiple activities, services, and sockets that were in use by wireless device 130. In other words, processing node 150, can take into account all of the activities the wireless device 130 was engaged in an order to determine a cause for a customer event that may have affected only one of the activities wireless device 130 was engaged in at the time of the customer experience event. Processing node 150 also takes into account end-to-end measures to help determine a cause of the customer experience event.

For example, take a hypothetical customer experience event of a dropped call. Processing node 150 may receive measures from one or more network layers running on wireless device 130, access node 110, elements of network 120, and/or content server 151. These measures may be aggregated in order to determine a cause of the dropped call.

For example, processing node 150 may determine that at the time of the dropped call, wireless device 130 was simultaneously engaged in the voice call, watching a video, and downloading a webpage. Processing node 150 may determine from these contexts the bandwidth required to download the webpage and watch the video overwhelmed the air-interface resources available across wireless link 140—thereby causing the dropped call. Thus, it should be understood, that the processing node 150 is capable of taking into account other activities occurring in association with wireless device 130, on access node 110, network 120, and/or content server 151. Processing node 150 is able to run an event analyzer which takes into account these other activities, the activity that failed, and/or other network conditions (as reported by the network layers running on the elements of communication system 100) in order to determine a cause for the customer experience event (i.e., failed activity).

Accordingly, it should be understood that communication system 100 is able to maintain awareness of user activity and is context aware. User activity awareness is used to identify points of parallel running contexts. Thus, communication system 100 is able to process multiple session traffic. These multiple sessions may or may not contain different content. Throughput speed results can be identified between minimum and maximum durations. Context awareness can be used to determine the expected behavior and to determine which measurement collection algorithm to use. Context identification can be attempted so that separate measures (by context) can be aggregated for improved accuracy. Because these techniques do not introduce additional traffic into communication system 100, they are defined as passive monitoring/throughput measurements. The measurements can be made on or by wireless device 130, and or other elements of communication system 100.

Figure 2:
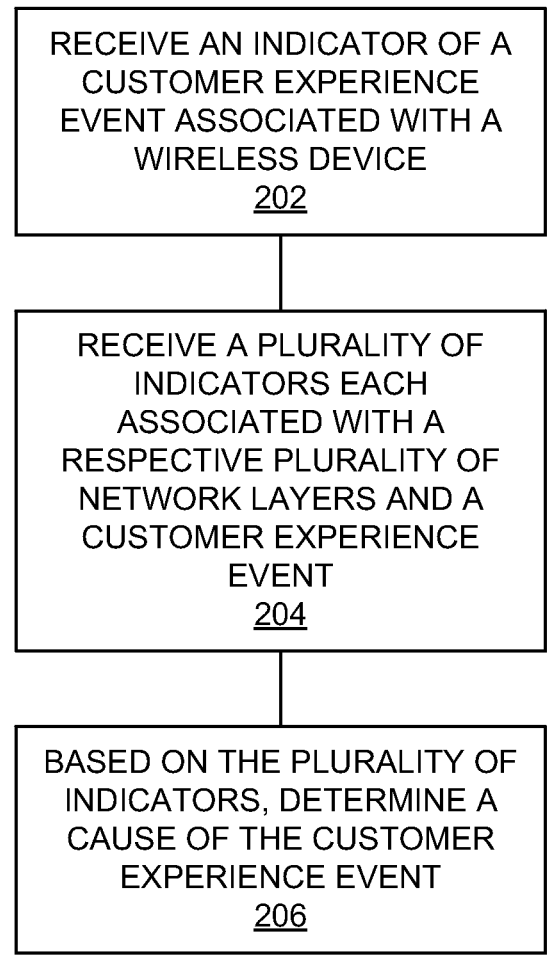
FIG. 2 is a flowchart illustrating a method of operating a communication system.

FIG. 2 is a flowchart illustrating a method of operating a communication system. The steps illustrated in FIG. 2 may be performed by one or more elements of communication system 100. An indicator of a customer experience event associated with the wireless device is received (202). For example, processing node 150 may receive an indicator that a customer experience event has occurred. This customer experience event may be associated with wireless device 130. The customer experience event may be, for example, a dropped call, jerky video, for unresponsive webpage.

A plurality of indicators each associated with a respective plurality of network layers and the customer experience event are received (204). For example, processing node 150 may receive a plurality of indicators of throughput. The plurality of throughput indicators may be passively measured by the network layers themselves. These throughput indicators may be associated with wireless device 130, applications, and/or services running on wireless device 130 by processing network layer information associated with a socket open routine call (e.g., by intercepting the socket open call and recording information about the socket).

Based on the plurality of indicators, a cause of the customer experience event is determined (206). For example, processing node 150 may use the throughput indicators measured by the network layers running on wireless device 130, access node 110, and/or content server 151 to establish what activity(s) a user of wireless device 130 was engaged in when the customer experience event occurred. Processing node 150 may use these measured indicators to monitor multiple activities, services, and sockets that were in use by wireless device 130. All of the activities wireless device 130 was engaged in may be used as inputs in order to determine a cause for a customer event.

All of the activities wireless device 130 was engaged in may be used as inputs in order to determine a cause for a customer experience event even though the customer experience event may may have only affected one (or a few) of the activities wireless device 130 was engaged in during (or around) the time of the customer experience event. These end-to-end, cross-service, and cross-application measures can be used to determine a cause of the customer experience event.

Figure 3:
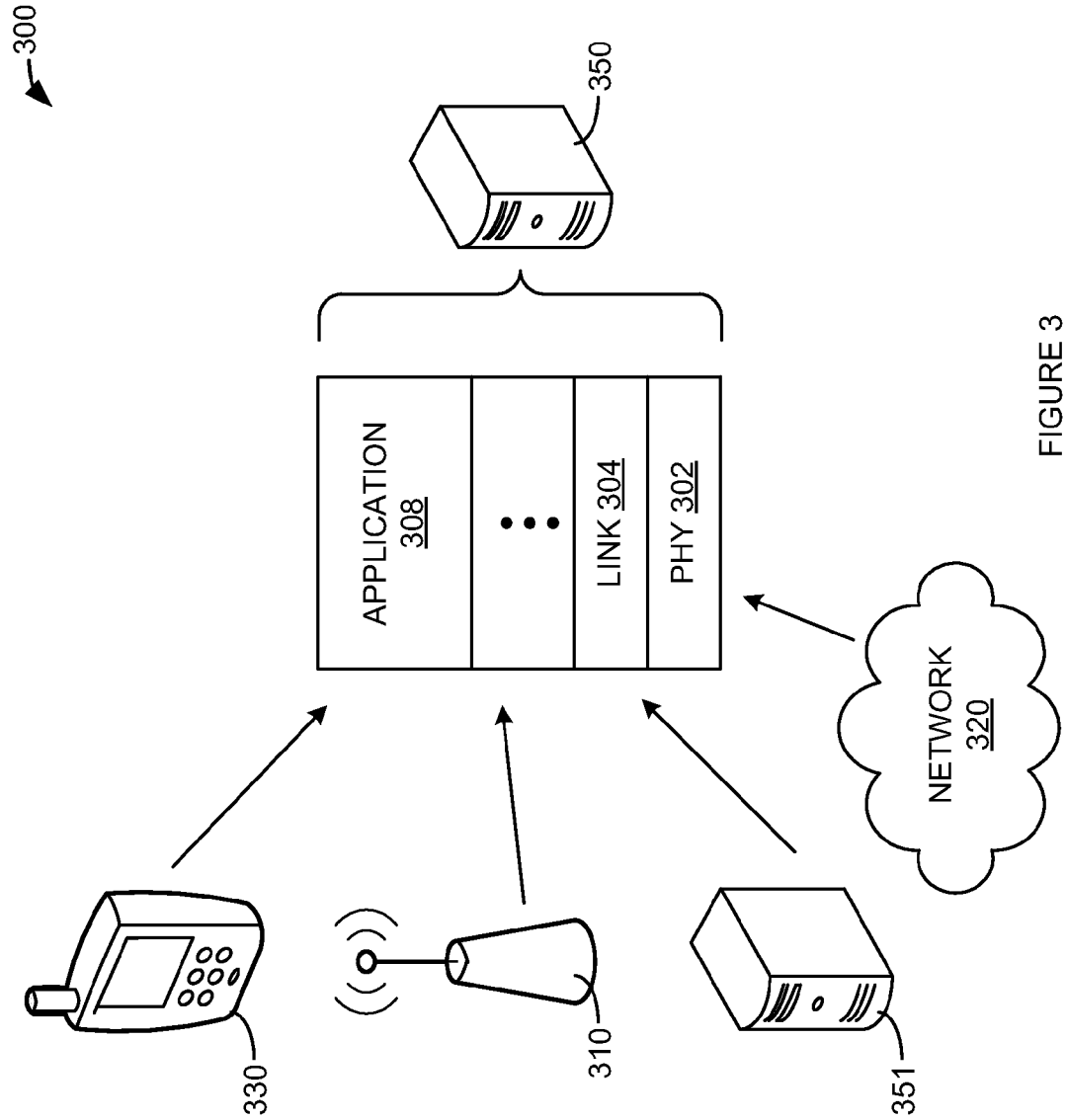
FIG. 3 is an illustration of inputs to an event analyzer system.

FIG. 3 is an illustration of inputs to an event analyzer system. In FIG. 3, communication system 300 comprises access node 310, network 320, wireless device 330, content server 351, and processing node 350. Each of access node 310, network 320, wireless device 330, and content server 351 may be, have, and/or execute one or more network layers—such as physical layer 302, link layer 304, and/or application layer 308. Information and/or measurements taken by each of access node 310, network 320, wireless device 330, and content server 351 and associated with the network layers on each of each of access node 310, network 320, wireless device 330, and content server 351, respectively, can be provided to processing node 350. The information and/or measurements provided by (and associated with) the one or more network layers on each of access node 310, network 320, wireless device 330, and content server 351, can be provided to processing node 350 in order to determine a cause of a customer experience event. The information and/or measurements (e.g., throughput measurements) provided by the one or more network layers of each of access node 310, network 320, wireless device 330, and content server 351, can be provided to processing node 350 in order to determine a cause of a customer experience event. For example, the throughput measured by or more applications running on wireless device 330, the throughput measured by the physical layer on access node 310, the response time of content server 351, etc. may be aggregated to determine a cause of a customer experience event.

Access node 310 is a network node capable of providing wireless communication to wireless device 330. Access node 310 can be, for example, one or more of a base transceiver station, a radio base station, an eNodeB device, or an enhanced eNodeB device.

Communication system 300 is a communication network that can provide wireless communication to wireless devices 330 and passively gather traffic information indicators associated with multiple applications and/or network layers. Network 320 is a communication network that can provide communication between access node 310, processing node 350, content server 351 and wireless device 330. Communication system 300 and network 320 can comprise wired and/or wireless communication networks that include processing nodes, routers, gateways, physical and/or wireless data links for carrying data among various network elements, including combinations thereof, and can include a local area network, a wide area network, and an internetwork (including the Internet). Communication system 300 and network 320 can also comprise wireless networks, including base station, wireless communication nodes, telephony switches, internet routers, network gateways, computer systems, communication links, or some other type of communication equipment, and combinations thereof.

Other network elements may be present in communication system 300 (and present in network 320, in particular) to facilitate wireless communication to/from wireless device 330 and content server 351 but are omitted for clarity, such as base stations, base station controllers, gateways, mobile switching centers, dispatch application processors, and location registers such as a home location register or visitor location register. Furthermore, other network elements may be present to facilitate communication between among elements of communication system 100 which are omitted for clarity, including additional processing nodes, routers, gateways, and physical and/or wireless data links for carrying data among the various network elements.

Wireless device 330 may be any device, system, combination of devices, or other such communication platform capable of communicating wirelessly with access node 310 and content server 351. Wireless device 330 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 310. Other types of communication platforms are possible.

In an embodiment, wireless device 330 may experience a customer experience event. For example, wireless device 330 may experience choppy video, and/or slow website download from content server 351. Processing node 350 may receive an indicator that this customer experience event occurred. Processing node 350 may analyze a plurality of indicators associated with this customer experience event in order to determine the cause of this customer experience event.

For example, processing node 350 may receive passively collected measures from network layers 302-308 that are reported by one or more of access node 310, network 320, wireless device 330, and/or content server 351. The measures can be used by processing node 350 to analyze the cause of the customer experience event. These passively collected measures may be used to determine service types associated with wireless device 330 when the customer experience event occurred. For example, processing node 350 may receive throughput measurements from one or more network layers 302-308 that are used to help determine the cause of customer experience event. These various network layers may include the air-interface layer network layer and application layer.

Figure 4:
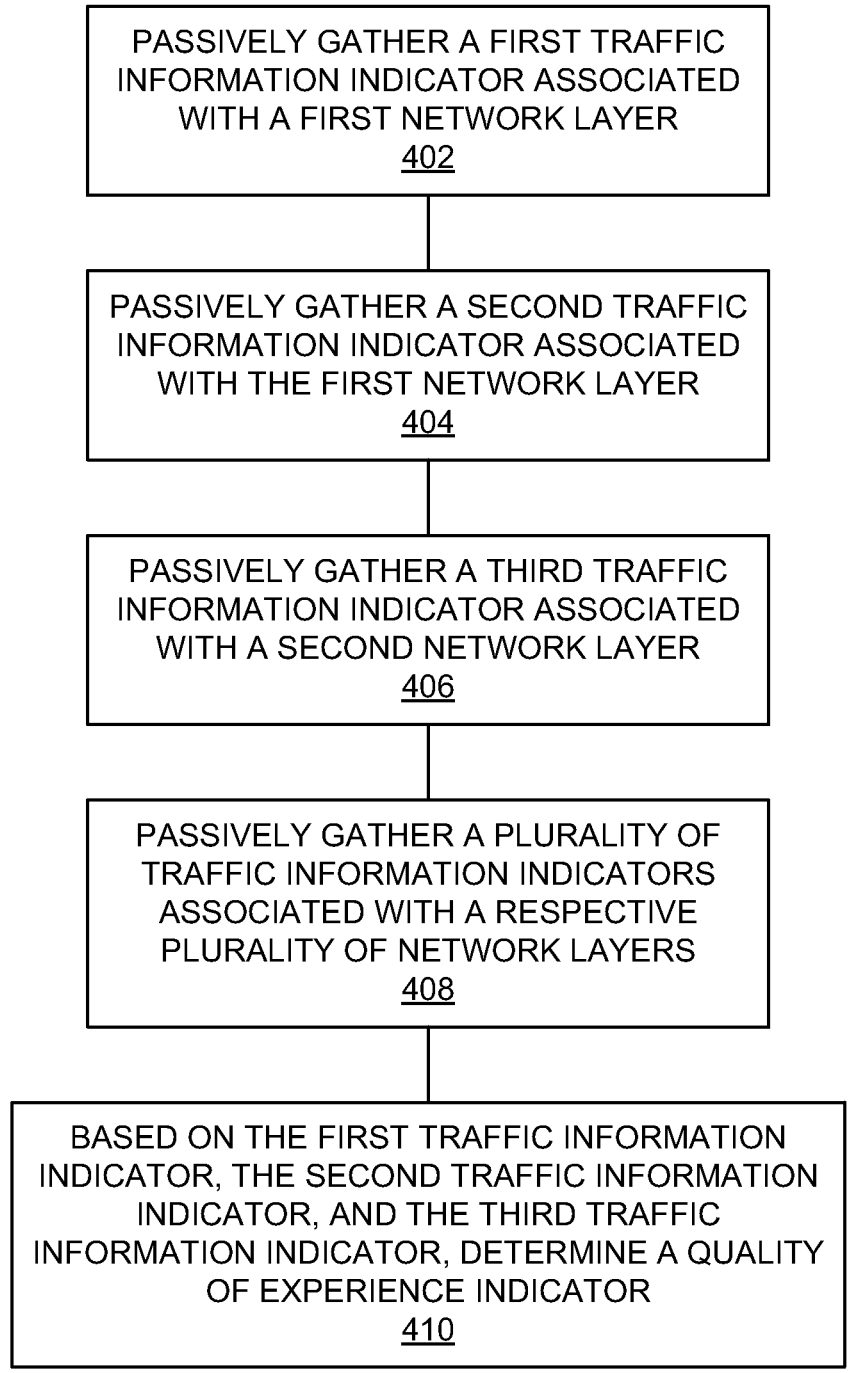
FIG. 4 is a flowchart illustrating a method of analyzing quality of experience indicators.

FIG. 4 is a flowchart illustrating a method of analyzing passively gathered quality of experience indicators. The steps illustrated in FIG. 4 may be performed by one or more elements of communication system 100 and/or communication system 300. A first traffic information indicator associated with a first network layer is gathered passively (402). For example, a throughput indicator associated with a voice call (i.e., application layer) by wireless device 330 may be gathered. The throughput indicator associated with the voice call may be reported by the voice call application without introducing additional traffic (e.g., test upload/download traffic). The throughput reported by the voice call application may be the bandwidth (throughput) used by the voice call.

A second traffic information indicator associated with the first network layer is gathered passively (404). For example, a throughput indicator associated with a video (i.e., application layer) being played on wireless device 330 may be gathered. The throughput indicator associated with the video may be reported by the video application without introducing additional traffic. The throughput reported by the video application may be the bandwidth (throughput) the video application requested from other network layers running on wireless device 330. The throughput reported by the video application may be the bandwidth used by the video application to receive/play the video.

A third traffic information indicator associated with a second network layer is gathered passively (406). For example, a throughput indicator associated with the air-interface conditions between access node 310 and wireless device 330 may be gathered. The throughput indicator associated with the air-interface conditions between access node 310 and wireless device 330 may be gathered, for example, by the physical layer on access node 310 and/or wireless device 330. In another example, the throughput indicator associated with the air-interface conditions between access node 310 and wireless device 330 may be gathered, for example, by the link layer on access node 310 and/or wireless device 330. The throughput reported by, for example, access node 310 may be the bandwidth (throughput) sent across the wireless link between access node 310 and wireless device 330.

A plurality of traffic information indicators associated with a respective plurality of network layers are gathered passively (408). For example, other elements of communication system 300 (e.g., network 120 and/or content server 351) may gather and report, using their respective network layers, throughput indicators associated with wireless device 330 and/or application(s) running on wireless device 330.

Based on the first traffic information indicator, the second traffic information indicator, and the third traffic information indicator, a quality of experience indicator is determined (410). For example, based on the throughput reported by the voice call application, the throughput reported by the video application, the throughput reported by access node 310 (and optionally other throughput indicators reported by other elements of communication system 100 that are associated with other network layers 302-308), a cause for a customer experience event may be determined. In another example, based on the throughput reported by the voice call application, the throughput reported by the video application, the throughput reported by access node 310 (and optionally other throughput indicators reported by other elements of communication system 100 that are associated with other network layers 302-308), a throughput experienced by a given application may be determined. Optionally, a throughput experienced by an application that did not report a throughput measure (e.g., a web browser) may be determined from throughput indicators reported by elements of communication system 100 that are associated with network layers 302-308.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 and/or communication system 300 may be, comprise, or include computers systems and/or processing nodes. This includes, but is not limited to: access node 110, network 120, wireless device 130, processing node 150, content server 151, access node 310, network 320, wireless device 330, processing node 350, and/or content server 351.

Figure 5:
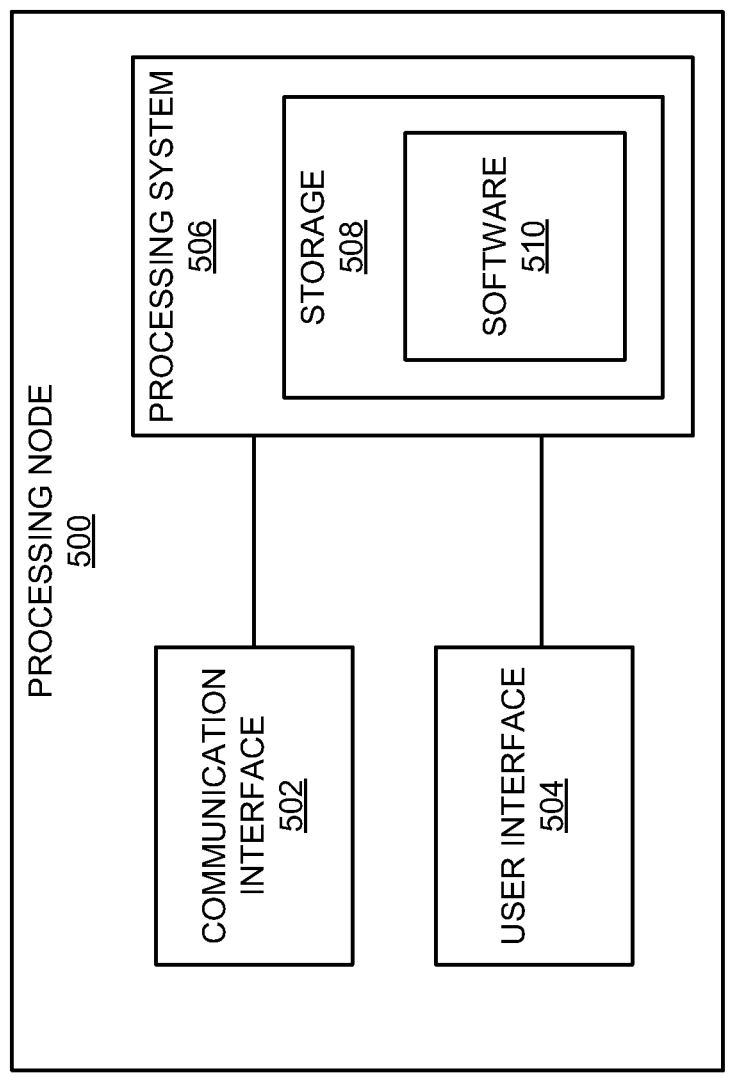
FIG. 5 illustrates a processing node.

FIG. 5 illustrates an exemplary processing node 500 comprising communication interface 502, user interface 504, and processing system 506 in communication with communication interface 502 and user interface 504. Processing node 500 is capable of paging a wireless device. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples example of processing node 500 include access node 110, wireless device 130, processing node 150, content server 151, access node 310, wireless device 330, processing node 350, content server 351. Processing node 500 can also be an adjunct or component of a network element, such as an element of access node 110, wireless device 130, processing node 150, content server 151, access node 310, wireless device 330, processing node 350, content server 351, a mobility management entity, a gateway, a proxy node, or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
   receiving an indicator of a customer experience event associated with a wireless device;
   determining a service type associated with the wireless device and the customer experience event;
   receiving a plurality of indicators associated with the customer experience event, the plurality of indicators comprising throughput information about at least two data streams that the wireless device was engaged in at the time of the customer experience event, wherein the throughput information is reported by each of an application layer, a network layer, and an air-interface layer;
   determining a throughput experienced by a first application that did not report a throughput measurement, based on throughput information reported by any combination of a second application on the application layer, the network layer, and the air-interface layer;
   aggregating the throughput information for the at least two data streams based on the service type; and
   based on the aggregated throughput information, determining a cause of the customer experience event.

2. The method of claim 1, further comprising: passively gathering said plurality of indicators.

3. The method of claim 2, wherein said plurality of indicators are based on traffic associated with a plurality of applications running on said wireless device.

4. A communication system, comprising:
   a plurality of network layers associated with communication with a wireless device, the plurality of network layers comprising an application layer, a network layer, and an air-interface layer, the plurality of network layers being configured to measure and report a plurality of throughput indicators comprising throughput information about at least two data streams that the wireless device was engaged in at the time of a customer experience event; and,
   an event analyzer configured to determine a service type of a customer experience event, determine a throughput experienced by a first application that did not report a throughput measurement, based on throughput information reported by any combination of a second application on the application layer, the network layer, and the air-interface layer, determine an aggregate throughput of the plurality of indicators based on the service type and, based on the aggregated throughput, determine a cause of the customer experience event.

5. The communication system of claim 4, wherein the plurality of network layers are configured to measure the plurality of throughput indicators passively.

6. A communication system, comprising:
   a first processing node, configured to:
   receive an indicator of a customer experience event associated with a wireless device;
   determine a service type associated with the wireless device and the customer experience event;
   receive a plurality of indicators associated with the customer experience event, the plurality of indicators associated with the customer experience event being reported by an application layer, a network layer, and an air-interface layer and comprising throughput information about at least two data streams that the wireless device was engaged in at the time of the customer experience event
   determine a throughput experienced by a first application that did not report a throughput measurement, based on throughput information reported by any combination of a second application on the application layer, the network layer, and the air-interface layer,
   aggregate the throughput information for the at least two data streams based on the service type; and
   based on the aggregated throughput information, determine a cause of the customer experience event.

7. The communication system of claim 6, further comprising:
   a second processing node, configured to:

passively gather at least one of said plurality of indicators associated with the customer experience event.

* * * * *